United States Patent
Tsuji

(10) Patent No.: US 9,447,881 B2
(45) Date of Patent: Sep. 20, 2016

(54) SEAL MATERIAL

(75) Inventor: Kazuaki Tsuji, Machida (JP)

(73) Assignee: Nippon Valqua Industries, Ltd., Tokyo (JP)

(*) Notice: Subject to any disclaimer, the term of this patent is extended or adjusted under 35 U.S.C. 154(b) by 119 days.

(21) Appl. No.: 12/920,146

(22) PCT Filed: Mar. 2, 2009

(86) PCT No.: PCT/JP2009/053818
§ 371 (c)(1),
(2), (4) Date: Aug. 30, 2010

(87) PCT Pub. No.: WO2009/113417
PCT Pub. Date: Sep. 17, 2009

(65) Prior Publication Data
US 2011/0018211 A1    Jan. 27, 2011

(30) Foreign Application Priority Data
Mar. 13, 2008 (JP) ................ 2008-063981

(51) Int. Cl.
*F16J 15/32* (2016.01)
*F16J 15/02* (2006.01)
*F16J 15/06* (2006.01)

(52) U.S. Cl.
CPC ............ *F16J 15/025* (2013.01); *F16J 15/064* (2013.01)

(58) Field of Classification Search
USPC ........ 277/559, 628, 616, 642, 641, 644, 560
See application file for complete search history.

(56) References Cited

U.S. PATENT DOCUMENTS

| | | | | |
|---|---|---|---|---|
| 2,706,655 A | * | 4/1955 | Showalter | 277/529 |
| 3,942,806 A | * | 3/1976 | Edlund | 277/589 |
| 4,193,606 A | * | 3/1980 | Iverson | 277/556 |
| 4,195,849 A | * | 4/1980 | Taft | 277/437 |
| 4,231,579 A | * | 11/1980 | Scannell | 277/559 |
| 4,399,998 A | * | 8/1983 | Otto | 277/552 |
| 4,487,421 A | * | 12/1984 | Housas et al. | 277/616 |
| 4,610,319 A | * | 9/1986 | Kalsi | E21B 10/24 175/371 |
| 4,690,414 A | * | 9/1987 | Haaland | 277/616 |
| 4,858,516 A | * | 8/1989 | Klein | 92/240 |
| 4,893,823 A | * | 1/1990 | Strouse et al. | 277/437 |
| 5,482,297 A | | 1/1996 | Burns et al. | |

(Continued)

FOREIGN PATENT DOCUMENTS

| | | |
|---|---|---|
| EP | 1087157 A2 | 3/2001 |
| EP | 1290363 A1 | 3/2003 |

(Continued)

*Primary Examiner* — Kristina Fulton
*Assistant Examiner* — Eugene G Byrd
(74) *Attorney, Agent, or Firm* — The Webb Law Firm

(57) ABSTRACT

Provided is a seal that can ensure a satisfactory sealing property and can be easily separated from a sealing surface even in the case in which the seal is used for a long period of time under the conditions of a high temperature and a high pressure. The seal includes a seal body mounted in a seal groove that is formed in a first member and a second member is made to be in pressure contact with the first member to form a sealing part. The sealing part that comes into contact with the second member at the entire surface of the sealing part is formed along the entire circumference of the outer peripheral surface of the seal. A step portion is formed on the outer peripheral surface of the seal in such a manner that an area of a contact surface is smaller for the sealing part as the contact area is closer to the bottom side of the seal groove.

10 Claims, 8 Drawing Sheets

(56) References Cited

U.S. PATENT DOCUMENTS

| | | | | |
|---|---|---|---|---|
| 5,575,484 | A | * | 11/1996 | Burke .................... 277/436 |
| 5,678,829 | A | * | 10/1997 | Kalsi et al. ............. 277/559 |
| 6,109,618 | A | * | 8/2000 | Dietle .................... 277/559 |
| 6,209,882 | B1 | * | 4/2001 | Riess ..................... 277/562 |
| 6,290,235 | B1 | * | 9/2001 | Albertson ............... 277/510 |
| 6,334,619 | B1 | * | 1/2002 | Dietle et al. ............ 277/559 |
| 6,494,462 | B2 | * | 12/2002 | Dietle .................... 277/549 |
| 6,814,358 | B2 | | 11/2004 | Keck |
| 7,306,237 | B2 | | 12/2007 | Tsuji et al. |
| 7,562,878 | B2 | * | 7/2009 | Dietle et al. ............ 277/559 |
| 2002/0135139 | A1 | | 9/2002 | Tanaka et al. |
| 2004/0239049 | A1 | * | 12/2004 | Hagano et al. ......... 277/628 |
| 2006/0145426 | A1 | * | 7/2006 | Schroeder et al. ..... 277/559 |
| 2007/0017860 | A1 | * | 1/2007 | Chikura et al. ........ 210/321.83 |

FOREIGN PATENT DOCUMENTS

| | | |
|---|---|---|
| JP | 5148476 A | 6/1993 |
| JP | 10318373 A | 12/1998 |
| JP | 3050919 B2 | 6/2000 |
| JP | 2004316724 A | 11/2004 |
| JP | 2005155781 A | 6/2005 |
| JP | 2006064030 A | 3/2006 |
| TW | 308247 | 6/1997 |
| TW | 200510660 A | 3/2005 |
| TW | M264401 U | 5/2005 |

* cited by examiner

SEAL MATERIAL

TECHNICAL FIELD

The present invention relates to a seal material.

BACKGROUND ART

A rubber seal material is extensively used as a general seal material that can easily ensure a sealing property by a low tightening force. For instance, a rubber seal material is used as a seal material for a semiconductor manufacturing apparatus or a gate valve for vacuum in a liquid crystal manufacturing apparatus.

A rubber seal material is in a shape of an O ring or lip packing in a general way. In addition, seals having an irregular cross section that are disclosed in Patent documents 1 to 3 for instance are used in many cases.

Patent document 1: Japanese Patent Application Laid-Open Publication No. 10-318373
Patent document 2: Japanese Patent Publication No. 3050919
Patent document 3: Japanese Patent Application Laid-Open Publication No. 2004-316724

A high temperature processing is carried out for a semiconductor manufacturing apparatus in some cases. At that time, an anchoring fixation may occur between a seal and a matching sealing surface disadvantageously. The anchoring fixation means a phenomenon in which a rubber seal and a matching sealing surface of a metal or the like come into contact with each other for a long period of time under the conditions of a high temperature and a high pressure and the rubber seal material and the matching sealing surface are jointed together physically and chemically, whereby a force that is required for separating the seal (a fixing force) is increased. In the case in which a metal seal is used in order to avoid the problem of the anchoring fixation, a great deal of load is required for tightening the seal material and it is necessary to increase the size of the apparatus. Consequently, it is desired to suppress an influence of fastening while a seal made of a rubber or the like is used.

The present invention was made in consideration of such conditions, and an object of the present invention is to provide a seal that can be easily separated from a matching sealing surface even in the case in which the seal material is used for a long period of time under the conditions of a high temperature and a high pressure for instance.

SUMMARY OF THE INVENITON

The present invention was made in order to solve the above problems of the conventional art.

A seal in accordance with the present invention is characterized by comprising a seal body that is mounted in a seal groove formed in a first member and having a sealing part formed by a second member that is made to be in pressure contact with the first member, wherein the sealing part that comes into contact with the second member at the entire surface of the sealing part is formed along the entire circumference of the outer peripheral surface of the seal material, and a step portion is formed on the outer peripheral surface of the seal in such a manner that an area of a contact surface is smaller for the sealing part as the contact area is closer to the bottom side of the seal groove.

By the above configuration, the seal can be easily separated from the second member (that is, a matching sealing surface) at a section in which an area of a contact surface is smaller for the sealing part as a starting point.

The seal in accordance with the present invention is characterized in that the step portion is formed on the surface of the leading end side of the lip part that is extended at a slant posture outward from the seal material body.

As described above, the present invention can be suitably and preferably applied to a lip sealing. More specifically, a step portion in which an area of a contact surface is smaller for the sealing part is formed on the surface of the leading end side of the lip part. Consequently, the seal can be easily separated from the second member at the step portion as a starting point.

The seal in accordance with the present invention is characterized in that the step portion is formed in such a manner that a curved line is drawn in a wavelike fashion in a front view.

In the case in which the step portion is formed in such a manner that a curved line is drawn in a wavelike fashion as described above, an area of a contact surface with the second member for the sealing part is varied uniformly in general at a generally constant interval in releasing a sealing. Consequently, a fixing force is also varied uniformly in general, and the seal material can be easily separated from the second member.

The seal in accordance with the present invention is characterized in that the step portion is formed by bonding a separate member.

In the case in which the step portion is formed by bonding a separate member to the seal as described above, a material provided with an excellent resistance to chemicals and an excellent resistance to a corrosion gas such as a fluorocarbon resin is used as a separate member as needed. Consequently, a seal material provided with an improved resistance to chemicals and an improved resistance to a corrosion gas can be proposed.

The seal in accordance with the present invention is characterized in that the seal is formed in such a manner that a height of the seal is uneven in a circumferential direction.

In the case in which the seal is formed in such a manner that a height of the seal is uneven in a circumferential direction as described above, a degree of a pressure contact of the second member and the seal is varied in a circumferential direction, whereby a fixing strength is varied in a circumferential direction. Consequently, the seal can be separated from the second member more easily at the position in which a fixing strength is smaller in a circumferential direction as a starting point.

By the seal in accordance with the present invention, a sealing property can be satisfactorily maintained in the state in which the seal material is tightened.

An area of a contact surface of the seal with the second member is smaller for the sealing part as the contact area is closer to the bottom side of the seal groove, and a fixing strength is also smaller for the sealing part as the contact area is closer to the bottom side of the seal groove. Consequently, the seal can be easily separated from the second member at a section in which an area of a contact surface is smaller for the sealing part as a starting point in the case in which a tightening force is released.

BEST MODE OF CARRYING OUT THE INVENTION

A seal in accordance with the present invention will be described below in detail with reference to the drawings.

Figure 1:
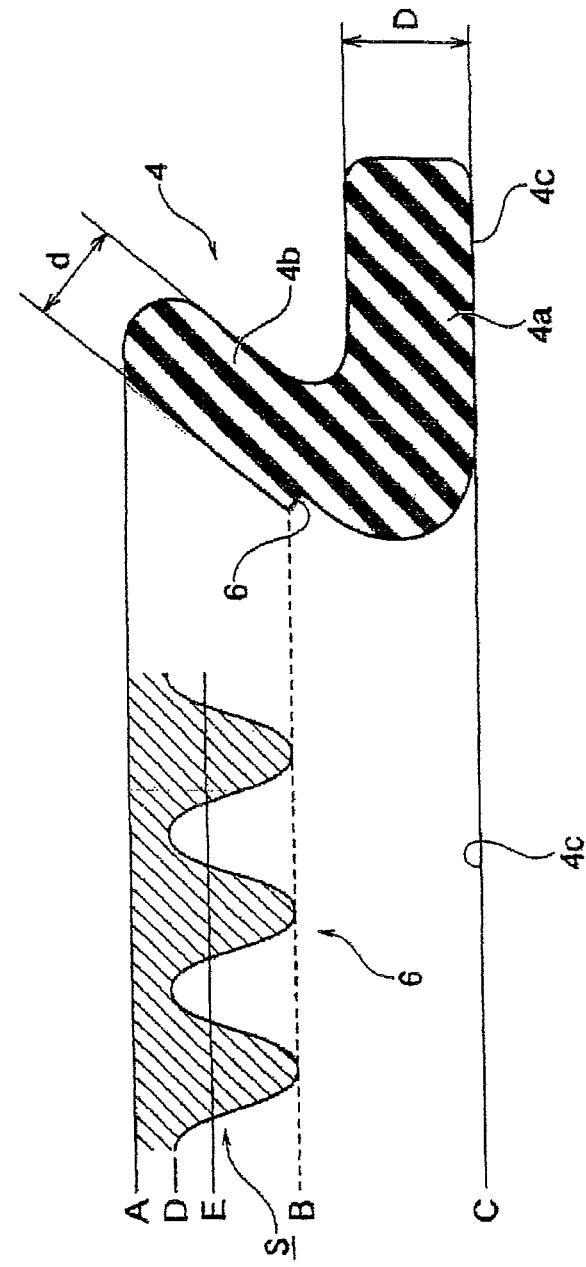
FIG. 1 is a schematic cross-sectional view for an explanation showing a seal in accordance with an embodiment of the present invention.
Figure 2:
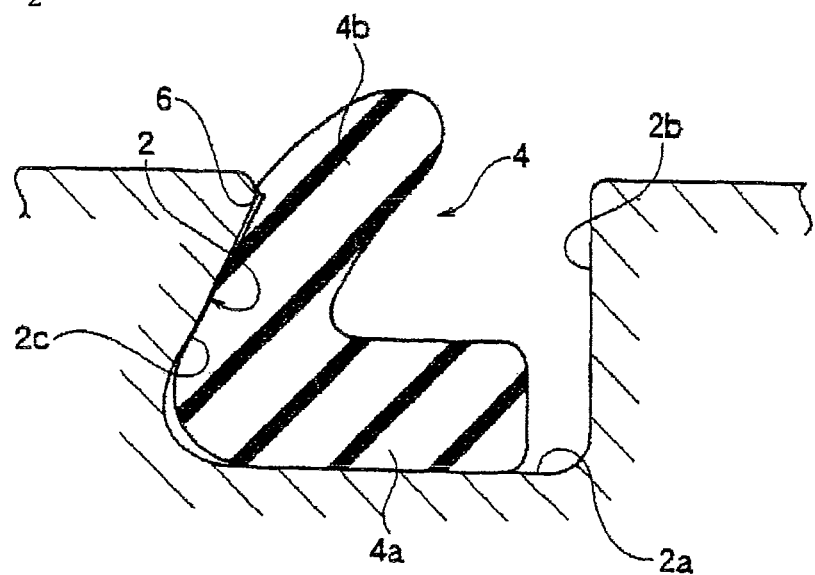
FIG. 2 is a partial cross-sectional view showing a partial dovetail groove in which a seal body shown in FIG. 1 is mounted.

FIG. 1 shows a seal 4 in accordance with an embodiment of the present invention. FIG. 2 is a cross-sectional view showing a partial dovetail groove 2 as a seal groove in which the seal 4 of FIG. 1 is mounted in particular.

The partial dovetail groove 2 is formed in a coupling joint part of a semiconductor manufacturing apparatus such as a dry etching apparatus and a plasma CVD apparatus. A width of a bottom face 2a of a seal groove is larger than a width of an opening part of the partial dovetail groove 2. A wall surface 2b on a diameter inward side of the partial dovetail groove 2 is a vertical surface, and wall surface 2c on a diameter outward side of the partial dovetail groove 2 is an inclined face.

On the other hand, the seal 4 has a closed ring structure and is formed in a generally L shape in a cross section. The seal 4 is composed of a seal body 4a that is mounted in the partial dovetail groove 2 and a lip part 4b that is extended to the outward of partial dovetail groove 2 at a slant posture from the seal body 4a. A section thickness D of the seal body 4a is larger than a section thickness d of the lip part 4b.

Moreover, a step portion 6 is formed between an outer surface of a leading end side and an outer surface of a base end side for the lip part 4b of the seal 4 in such a manner that a side of the seal body 4a is lower than a side of the lip part 4b. The step portion 6 is formed in a circumferential direction of the seal 4 in a successive manner. In a front view partially as shown in FIG. 1, in the case in which a leading end of the lip part 4b is A, a leading end of a lower side of the lip part 4b is B, and a bottom face 4c of the seal body 4a is C, a curved line forming the step portion 6 is visible as a curved line S extending to right and left between A and B. The step portion 6 that is formed along the curved line S as described above is formed by an electric discharge machining for instance. Moreover, the step portion 6 can also be formed by a cutting work or a molding.

The seal 4 is preferably made of an elastically deformable material. Although the material of the seal 4 is not restricted in particular, it is preferable that the seal 4 is made of a synthetic rubber such as a natural rubber and a fluorocarbon rubber.

The seal 4 in accordance with the present embodiment is configured as described above. The operation of the seal 4 will be described in the following with reference to FIGS. 3 and 4.

Figure 3:
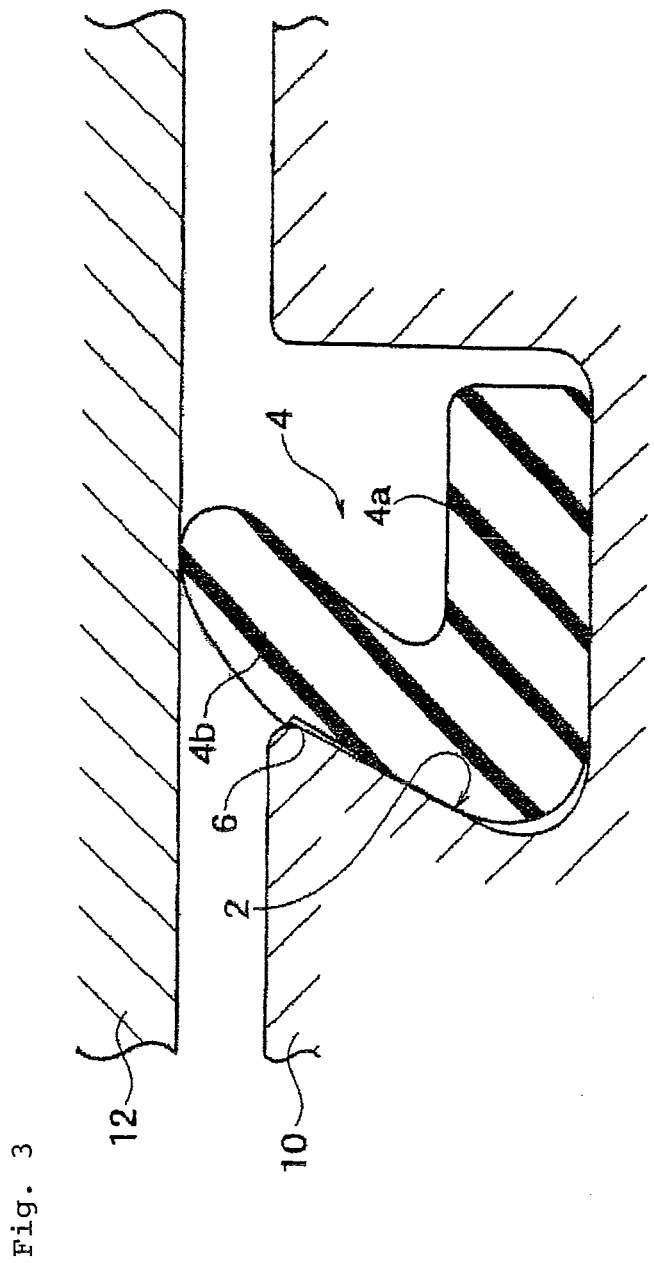
FIG. 3 is a schematic cross-sectional view showing an initial state in the case in which a seal material in accordance with an embodiment of the present invention is mounted in a partial dovetail groove and is compressed.
Figure 4:
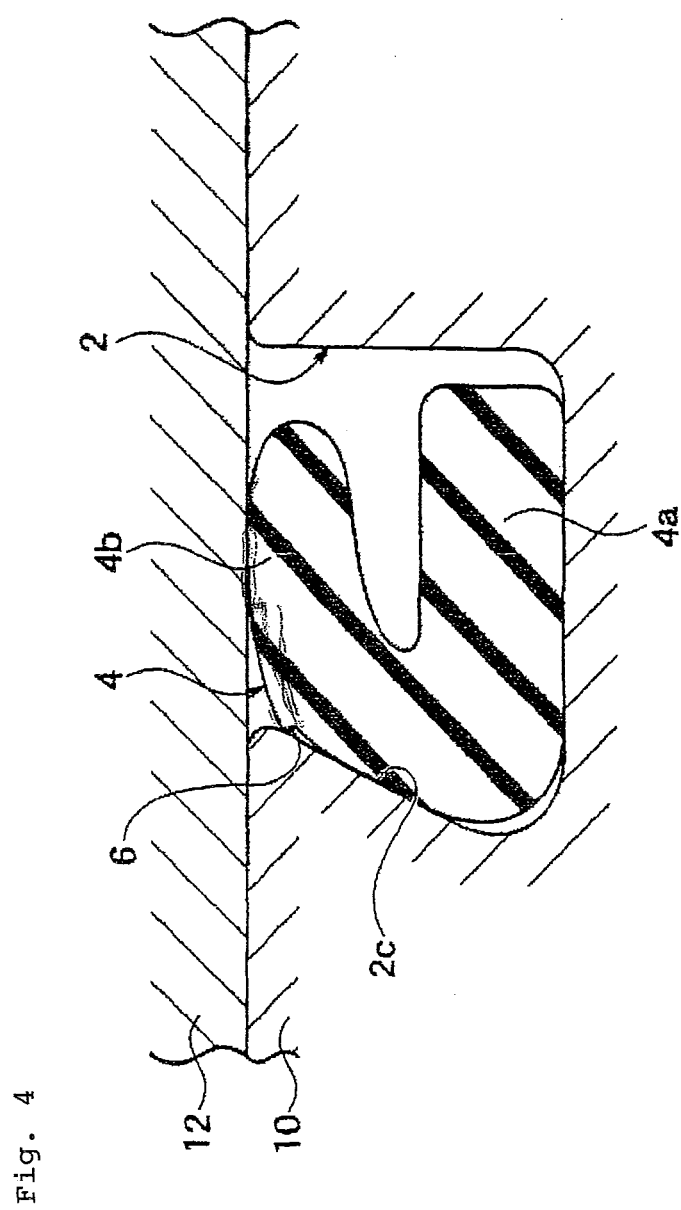
FIG. 4 is a schematic cross-sectional view showing a state in the case in which a seal material in accordance with an embodiment of the present invention is mounted in a partial dovetail groove and a sealing state is implemented.

The seal 4 is mounted in the partial dovetail groove 2 disposed between a first member 10 and a second member 12 to be sealed. FIGS. 3 and 4 show left cross sections of the partial dovetail groove 2, and the center of the seal 4 is located on the right side of FIGS. 3 and 4.

In the case in which the second member 12 is made to be in pressure contact with the first member 10 in the state in which the seal 4 is mounted in the partial dovetail groove 2 as shown in FIG. 3, the seal 4 is tightened and the surface on the leading end side of the lip part 4b is made to be in pressure contact with the second member 12 as shown in FIG. 4.

At this time, an area that is enclosed by the straight line A and the curved line S (a diagonal lines part in FIG. 1) is a sealing part between the first member 10 and the second member 12 for the lip part 4b shown in FIG. 1, and the sealing part ensures a sealing property.

In other words, in the case in which the seal 4 is compressed between the first member 10 and the second member 12, the lip part 4b is going to fall over while a contact in a circumferential direction is maintained along the entire circumference in the A-D area of the lip part 4b.

In the state in which the lip part 4b falls over full and complete (state in use) as shown in FIG. 4, the A-D area of the lip part 4b comes into contact with the second member 12 at the entire surface of the sealing section along the entire circumference, thereby ensuring a sealing property.

On the other hand, in the D-B area in which the step portion 6 of a waveform shown in FIG. 1 exists, the seal 4 does not come into contact with the second member 12 on the matching side along the entire circumference. In other words, as shown by the straight line E, a part that comes into contact with the second member 12 and a part that does not come into contact with the second member 12 appear one after the other. Moreover, as a contact area is closer to the leading end B of a lower side of the lip part 4b, the area of the contact surface is smaller for the sealing section.

At the leading end B of a lower side of the lip part 4b, the area of the contact surface with the second member 12 is smallest. Consequently, even in the state in which the seal 4 is tightened, it is hard to result in an anchoring fixation at the leading end B of a lower side of the lip part 4b.

The following describes the case in which a tightening force of the seal material is released.

In the case in which a tightening force of the first member 10 and the second member 12 is released, the seal 4 is going to be separated at the leading end B of a lower side of the lip part 4b at first. In this case, since the area of the contact surface with the second member 12 is smallest at the leading end B of a lower side of the lip part 4b, the seal 4 can be easily separated at the leading end B of a lower side of the lip part 4b as a starting point. In addition, as a contact area is closer to the straight line D shown in FIG. 1, the area of the contact surface is increased in small steps, whereby the seal 4 can be separated with a certainty.

While the preferred embodiment in accordance with the present invention has been described above, the present invention is not restricted to the embodiment, and various changes, modifications; and functional additions can be thus made without departing from the scope of the present invention.

Figure 5:
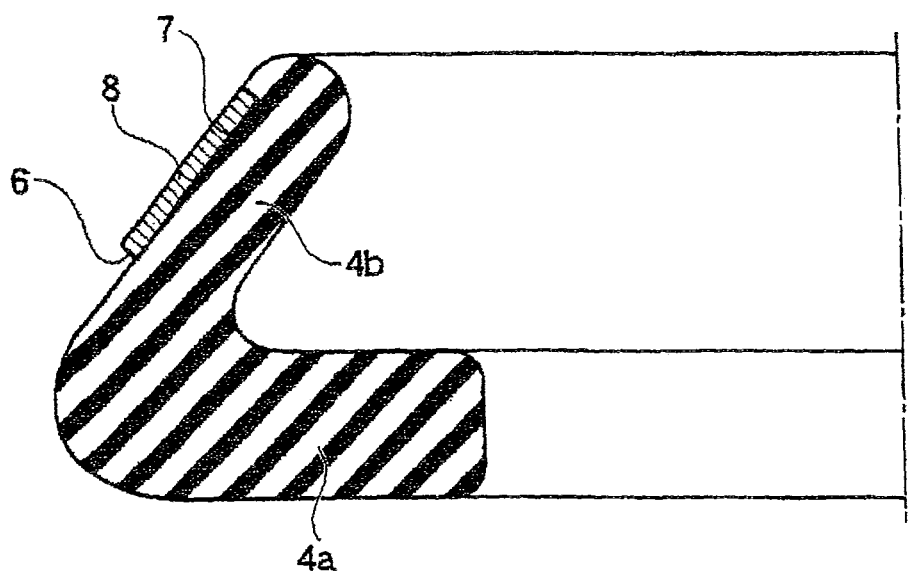
FIG. 5 is a partial cross-sectional view showing a seal material in accordance with another embodiment of the present invention.

For the above embodiment for instance, the seal body 4a and the lip part 4b are made of the same material and are formed in an integrated manner As substitute for this however, a groove 7 is formed in the lip part 4b along the entire circumference in such a manner a curved line S can be formed in a front view as shown in FIG. 5, and a separate member 8 can be bonded to the groove 7. Moreover, the separate member 8 can be in a ring shape (in an endless shape) or a band form (in a strip shape) can be arranged in a circular pattern. Although the separate member 8 can be made of a material equivalent to that of the seal body 4a or the lip part 4b, the separate member 8 can be made of another material. For instance, a part that is a total base substrate can be made of a rubber having an enriched elasticity, and the separate member 8 can be made of a fluorocarbon rubber. In the case in which a fluorocarbon rubber is used for the separate member 8 as described above, the lip part 4b can be provided with a resistance to chemicals and a resistance to a plasma gas.

As a fluorocarbon rubber, there can be used a vinylidene fluoride rubber of a binary system such as a vinylidene fluoride/hexafluoropropylene copolymer, a vinylidene fluoride/trifluorochloroethylene copolymer, and a vinylidene fluoride/pentafluoropropylene copolymer, a vinylidene fluoride rubber of a ternary system such as a vinylidene fluoride/tetrafluoroethylene/hexafluoropropylene copolymer, a vinylidene fluoride/tetrafluoroethylene/perfluoroalkylvinyl ether copolymer, and a vinylidene fluoride/tetrafluoroethylene/propylene copolymer, a tetrafluoroethylene/propylene copolymer, a tetrafluoroethylene/perfluoroalkylvinyl ether copolymer, and a thermoplastic fluorocarbon rubber.

As described above, since the surface of the lip part 4b is made of a fluorocarbon rubber, even in the case in which the lip part comes into contact with a corrosive gas or plasma, a resistance property against a corrosive gas and plasma or the like is satisfactory.

Figure 6:
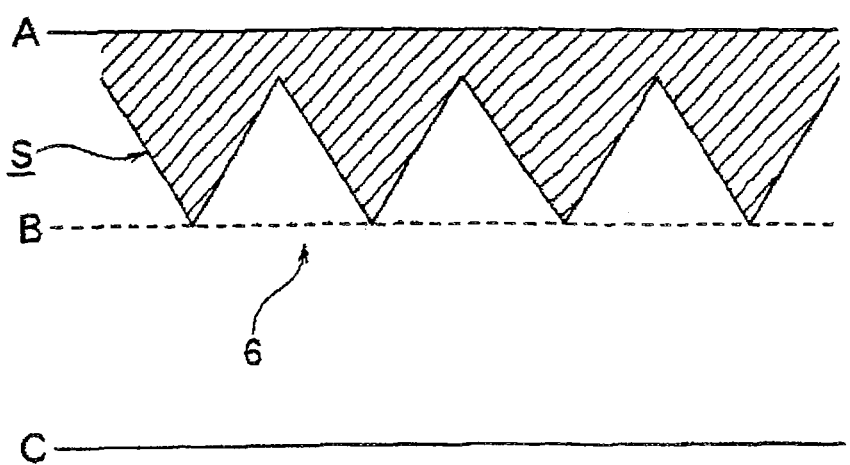
FIG. 6 is a partial cross-sectional view showing a line S of a step portion in accordance with another embodiment of the present invention.

While the step portion 6 is formed in such a manner that a curved line S is drawn in a wavelike fashion in the above embodiment, the present invention is not restricted to the embodiment. The step portion 6 can also be formed by a straight line S in an angular shape or in a V shape as shown in FIG. 6.

Figure 7A:
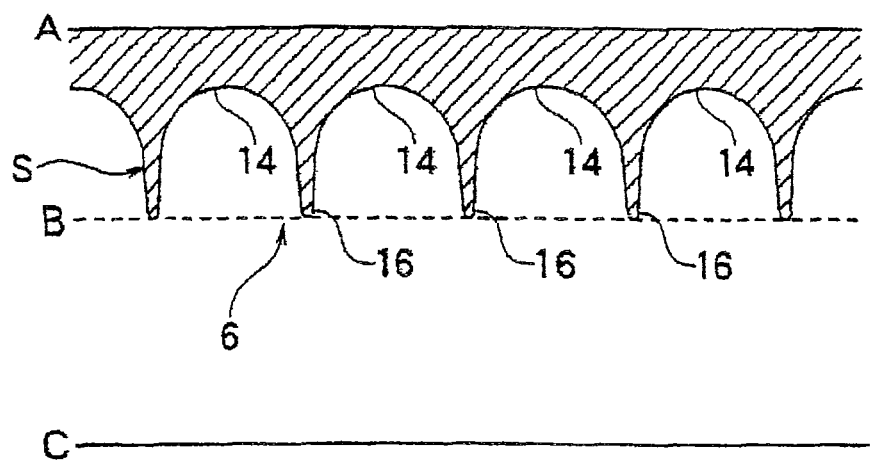
FIGS. 7(A) and 7(B) are views showing a curved line S of a step portion in accordance with another embodiment of the present invention.

Moreover, the step portion 6 can also be formed by a curved line S in a wavelike pattern formed by a combination of a large circular arc 14 and a small circular arc 16 as shown in FIG. 7(A).

Figure 7B:
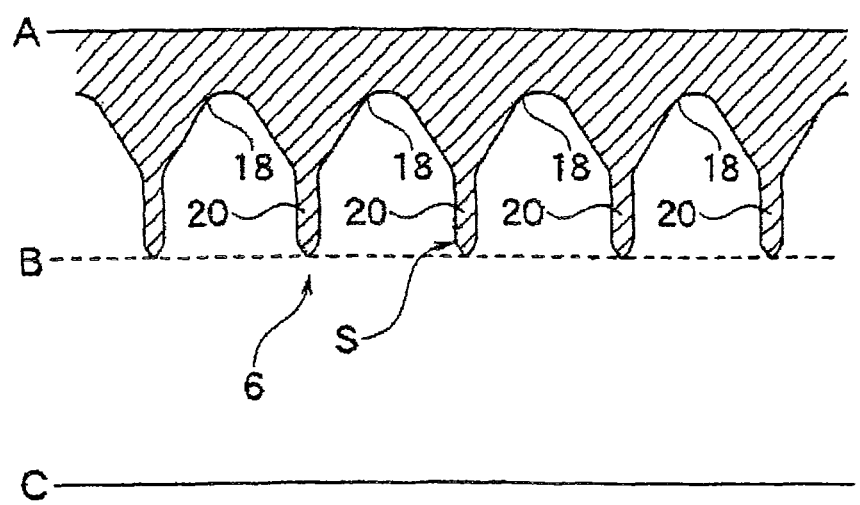

Moreover, the step portion 6 can also be formed by a curved line S composed of a combination of a large circular arc 18 and a convex portion 20 formed at the leading end of the large circular arc 18 as shown in FIG. 7(B). A line configuring the step portion 6 can be any line providing the area of the contact surface is smaller for the sealing section as a contact area of the second member 12 and the lip part of the seal 4 is closer to the bottom side of the seal groove 2. Furthermore, a height H1 and a height H2 of the lip part 4b that is configured on the upper side of the step portion 6 can be partially uneven as shown in FIG. 8.

Figure 8:
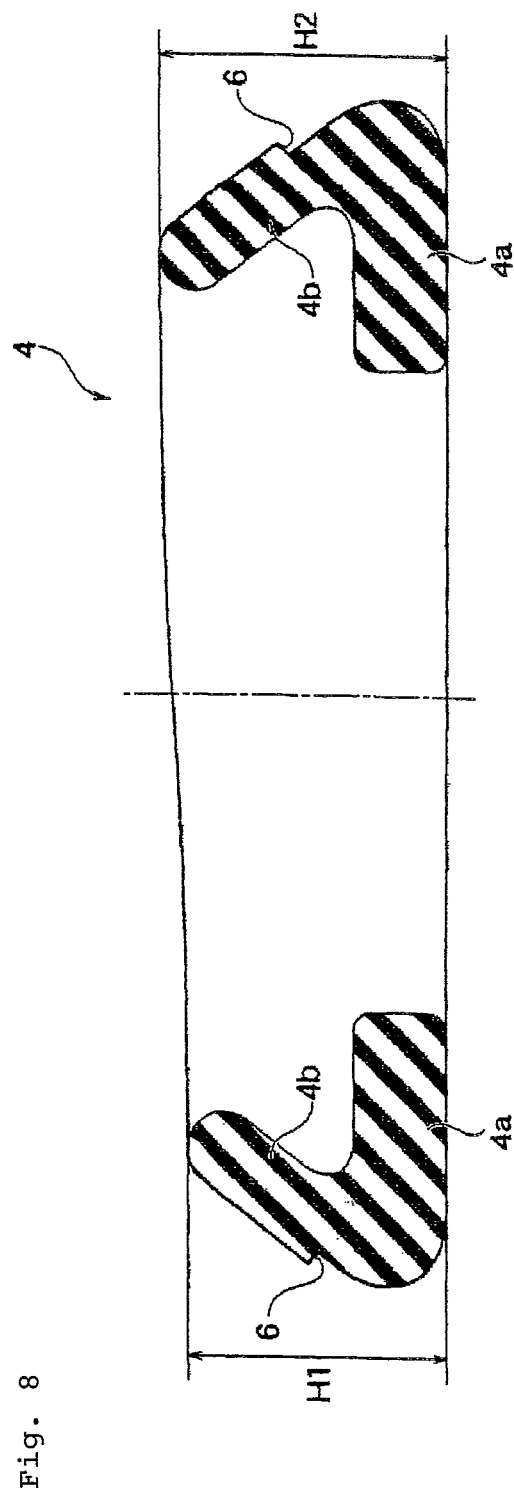
FIG. 8 depicts cross-sectional views showing examples in which a shape of a seal in accordance with another embodiment of the present invention is not uniform in a circumferential direction and heights are uneven at some positions.

One side of the lip part 4b is higher than the other side of the lip part 4b for the example shown in FIG. 8. However, such a difference in height of the lip part 4b can also be formed at a number of locations in a circumferential direction. The main point is that a degree of a pressure contact of the second member 12 and the seal 4 is varied in a circumferential direction in the case in which a height of the seal 4 is uneven as a whole in a circumferential direction. Consequently, a fixing strength of the seal 4 can be uneven a circumferential direction, and a fixing strength of the seal 4 can be adjusted. More specifically, since a position in which a fixing strength is smaller can be formed at the discretion in a circumferential direction, the seal 4 can be separated more easily at the position in which a fixing strength is smaller in a circumferential direction as a starting point.

While the seal 4 that is mounted in the partial dovetail groove 2 is described in the above embodiment, a seal groove in accordance with the present invention is not restricted to the partial dovetail groove 2.

Moreover, the seal 4 is not restricted to the lip seal provided with the lip part 4b, and an O ring having a cross section of a circular shape can also be adopted.

The present invention can also be applied to an irregular shaped seal.

The invention claimed is:

1. A seal is mounted in a seal groove formed in a first member and which provides a sealing property between the first member and a second member when the second member is made to be in pressure contact with the first member,
wherein the seal groove in which the seal is mounted is a partial dovetail groove in which a width of a bottom face of the seal groove is larger than a width of an opening part of the seal groove,
the partial dovetail groove having a wall surface on a diameter inward side that is a vertical surface, and a wall surface on a diameter outward side that is an inclined face,
wherein the seal is formed in a generally L-shape in a cross section, and is composed of a seal material body that is mounted on the bottom face of the partial dovetail groove, and a lip part that is extended outward from the partial dovetail groove at a slant posture from the seal material body and that is provided along the wall surface of the diameter outward side of the partial dovetail groove,
wherein an outer surface of the lip part that is projected from the partial dovetail groove has a sealing part, the sealing part being formed at an entire surface of the sealing part while being in pressure contact with the second member, when the seal is mounted in the partial dovetail groove and the second member is made to be in pressure contact with a first member,
wherein a step portion is formed on the outer surface of the lip part in such a manner that a position of the step portion varies around the circumference of the lip part from a low position, located nearer to the seal material body, and a high position, located nearer to the leading end of the lip part, and wherein a thickness of the lip part at a position downward from the step portion is less than a thickness of the lip part at a position upward from the step portion, and
wherein the step portion has a surface that is a curved wavelike line when viewed in a front view.

2. The seal as defined in claim 1, wherein the step portion is formed by bonding a separate member.

3. The seal as defined in claim 2, wherein the seal is formed in such a manner that a height of the seal is uneven in a circumferential direction.

4. The seal as defined in claim 1, wherein the seal is formed in such a manner that a height of the seal is uneven in a circumferential direction.

5. The seal as defined in claim 1, wherein the step portion comprises a vertical portion, which extends outward from the lip part, and a horizontal portion, which extends along the surface of the lip part from the vertical portion to a free end of the lip part.

6. The seal as defined in claim 5, wherein a distance between the vertical portion and the free end of the lip part varies in a cyclical manner along a circumference of the seal.

7. The seal as defined in claim 5, wherein a surface of the vertical portion of the step portion comprises a curved and undulating surface.

8. The seal as defined in claim 1, wherein a length of the sealing part, which is defined as a distance between the step portion and a free end of the lip part, varies in a cyclical manner along the circumference of the seal.

9. A seal is mounted in a seal groove formed in a first member and which provides a sealing property between the first member and a second member when the second member is made to be in pressure contact with the first member,
   wherein the seal groove in which the seal is mounted is a partial dovetail groove in which a width of a bottom face of the seal groove is larger than a width of an opening part of the seal groove,
   the partial dovetail groove having a wall surface on a diameter inward side that is a vertical surface, and a wall surface on a diameter outward side that is an inclined face,
   wherein the seal is formed in a generally L-shape in a cross section, and is composed of a body that is mounted on the bottom face of the partial dovetail groove, and a lip part that extends from the partial dovetail groove at a slant posture from the body,
   wherein the lip part comprises a free end that projects from the partial dovetail groove and wherein a sealing part is formed along an outer surface of the lip part downward from the free end thereof, the sealing part being in pressure contact with the second member, when the seal is mounted in the partial dovetail groove and the second member is made to be in pressure contact with the first member,
   wherein a step portion is formed on the lip part, the step portion comprising a vertical portion, which extends from the lip part, and a horizontal portion, which extends from the vertical portion to the free end of the lip part,
   wherein a distance between the vertical portion of the step portion and the free end of the lip part varies in a cyclical manner along a circumference of the seal, and
   wherein the vertical portion of the step portion comprises a curved and undulating surface.

10. The seal as defined in claim 9, wherein a length of the sealing part, which is defined as a distance between the step portion and the free end of the lip part, varies in a cyclical manner along the circumference of the seal.

* * * * *